United States Patent
Akenine-Möller et al.

(10) Patent No.: US 7,633,507 B2
(45) Date of Patent: Dec. 15, 2009

(54) GRAPHICS TEXTURE PROCESSING METHODS, APPARATUS AND COMPUTER PROGRAM PRODUCTS USING BLOCK OVERLAPPING AND/OR TEXTURE FILTERING

(75) Inventors: Tomas Akenine-Möller, Göteborg (SE); Jacob Ström, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 167 days.

(21) Appl. No.: 11/179,704

(22) Filed: Jul. 12, 2005

(65) Prior Publication Data

US 2005/0264573 A1  Dec. 1, 2005

Related U.S. Application Data

(63) Continuation of application No. 10/326,849, filed on Dec. 20, 2002, now Pat. No. 6,940,511.

(60) Provisional application No. 60/387,049, filed on Jun. 7, 2002.

(51) Int. Cl.
*G09G 5/00* (2006.01)
*G06F 15/16* (2006.01)
*G06T 11/40* (2006.01)
*G06K 9/60* (2006.01)

(52) U.S. Cl. ................ 345/581; 345/503; 345/582; 345/552; 345/587; 382/303; 382/305

(58) Field of Classification Search ................ 345/503, 345/522, 531, 552, 582–583, 586–587, 608–609; 382/232–233

See application file for complete search history.

(56) References Cited

U.S. PATENT DOCUMENTS 5,920,495 A  7/1999  Hicok et al. ........... 364/724.05

(Continued)

FOREIGN PATENT DOCUMENTS

GB  1 517 383  7/1978

(Continued)

OTHER PUBLICATIONS

Ivanov et al., "Color Distribution—a new approach to texture compression," Computer Graphics Forum, Amsterdam, NL, vol. 19, No. 3, Aug. 21, 2000, pp. C283-C289, C535.

(Continued)

*Primary Examiner*—Wesner Sajous
(74) *Attorney, Agent, or Firm*—Michael G. Cameron

(57) ABSTRACT

A pixel is textured by storing a first texel reference value, a second texel reference value, and texel mapping values where each texel mapping value represents a k-tuple of (ternary) references to the first texel reference value, the second texel reference value and a third texel reference value to thereby represent a block of texels. A pixel value for the pixel is generated from the stored texel values and the pixel is displayed responsive to the generated pixel value. In some embodiments, respective pluralities of texel reference values and texel mapping values that map thereto are stored for respective ones of a plurality of overlapping blocks of texels. In further embodiments, a first mipmap value for a pixel is bilinearly interpolated from the retrieved texel values for the set of nearest neighbor texels. A second mipmap value for the pixel is generated by averaging the retrieved texel values for the set of nearest neighbor texels. A pixel value for the pixel is generated by interpolating between the first and second mipmap values. The present invention may be embodied as methods, apparatus and computer program products.

2 Claims, 5 Drawing Sheets

U.S. PATENT DOCUMENTS

| | | | | |
|---|---|---|---|---|
| 5,956,431 | A | 9/1999 | Iourcha et al. | 382/253 |
| 6,016,152 | A | 1/2000 | Dickie | 345/436 |
| 6,181,347 | B1 | 1/2001 | Devic et al. | 345/430 |
| 6,184,893 | B1 | 2/2001 | Devic et al. | 345/430 |
| 6,236,405 | B1 | 5/2001 | Schilling et al. | 345/430 |
| 6,259,460 | B1 | 7/2001 | Gossett | |
| 6,292,193 | B1 | 9/2001 | Perry et al. | 345/430 |
| 6,304,268 | B1 | 10/2001 | Iourcha et al. | 345/428 |
| 6,366,290 | B1 | 4/2002 | Dye et al. | 345/582 |
| 6,452,603 | B1 * | 9/2002 | Dignam | 345/582 |
| 6,459,433 | B1 | 10/2002 | Walton | |
| 7,336,284 | B2 * | 2/2008 | Morein et al. | 345/552 |
| 2002/0122043 | A1 | 9/2002 | Freeman | |
| 2002/0180749 | A1 * | 12/2002 | Hsiao et al. | 345/586 |
| 2003/0095130 | A1 * | 5/2003 | Chiang et al. | 345/582 |
| 2004/0151372 | A1 * | 8/2004 | Reshetov et al. | 382/166 |
| 2006/0164429 | A1 * | 7/2006 | Mantor et al. | 345/582 |

FOREIGN PATENT DOCUMENTS

| | | |
|---|---|---|
| JP | 09-044695 | 2/1997 |
| JP | 11232470 A | 8/1999 |
| JP | 2000-155851 | 6/2000 |
| WO | WO 99/22519 | 5/1999 |
| WO | WO 99/67748 | 12/1999 |
| WO | WO 00/28479 | 5/2000 |

OTHER PUBLICATIONS

Delp et al., "Image Compression Using Block Truncation Coding," IEEE Transactions on Communications, IEEE Inc., New York, US, vol. COM-27, No. 9, Sep. 1979, pp. 1335-1342.

Standard Search Report, U.S. Appl. No. 10/326,849, filed Dec. 20, 2002, May 23, 2003.

Zavacky et al., "Resampling of an Image By Block-Based Interpolation or Decimation with Compensation," Radioengineering, Prague, CZ, vol. 9, No. 2, Jun. 2000, pp. 18-24.

International Search Report, PCT/EP03/05747, Sep. 29, 2003.

Möller et al., "Real-Time Rendering," $2^{nd}$ edition, Chapter 5 Texturing, Jun. 2002, pp. 117-145.

Beers et al., "Rendering from Compressed Textures," Computer Graphics (SIGGRAPH 96 Proceedings), Aug. 1996, 4 pages.

Uwe Behrens, "Averaged Area Tables for Texture Filtering," SIGGRAPH 2001 Conference Abstracts and Applications, 2001, p. 150.

Franklin C. Crow, "Summed-Area Tables for Texture Mapping," Computer Graphics (SIGGRAPH '84 Proceedings), Jul. 1974, pp. 207-212.

Cross, Jason, "DXTn Texture Compression," http://www.cdmag.com/articles/021/068/dxt.feature.html, 1999, 4 pages.

Tseng, Jeffrey, "The Truth About S3TC," http://www.hardwarecentral.com/hardwarecentral/print/140/1, May 29, 1995, 5 pages.

McCabe et al., "DirectX 6 Texture Map Compression," Game Developer, Aug. 1993, 4 pages.

Williams, Lance, "Pyramidal Parametrics," Computer Graphics, vol. 7, No. 3, Jul. 1983, pp. 65-75.

Akenine-Moller, T., et al., "Graphics for the Masses; A Hardware Rasterization Architecture for Mobile Phones," ACM Transaction of Graphics, Jul. 2003, p. 801-808.

Levkovich-Maslyuk, L., et al., "Texture Compression with Adaptive Block Partitions," Proceedings of the $8^{th}$ ACM International Conference on Multimedia, Oct. 2000, p. 401-403.

Woo, R., et al., "A 80/20MHZ Multimedia Processor Integrated With Embedded DRAM MPEG-4 Accelerator and 3D Rendering Engine for Mobile Applications," ISSCC 2001, Session 9, Integrated Multimedia Processors, p. 142-143.

* cited by examiner

GRAPHICS TEXTURE PROCESSING METHODS, APPARATUS AND COMPUTER PROGRAM PRODUCTS USING BLOCK OVERLAPPING AND/OR TEXTURE FILTERING

RELATED APPLICATIONS

The present application is a continuation of U.S. application Ser. No. 10/326,849 filed on Dec. 20, 2002, which claims priority from U.S. Provisional APPLICATION Ser. No. 60/387,049 filed Jun. 7, 2002, the contents of which are hereby incorporated by reference in its their entirety.

BACKGROUND OF THE INVENTION

1. Technical Field of the Invention

The present invention relates to computer graphics, and more particular, to graphics texture processing methods, apparatus and computer program products.

2. Description of Related Art

The real-time rendering of three-dimensional graphics has a number of appealing applications on mobile terminals, including games, man-machine interfaces, messaging and m-commerce. Since three-dimensional rendering is a computationally expensive task, dedicated hardware must often be built to reach sufficient performance. Innovative ways of lowering the complexity and bandwidth usage of this hardware architecture are thus of great importance.

One standard way of increasing the level of realism in real-time rendering is to apply textures to the surfaces. This can be done in a variety of ways, including environment mapping, bump mapping, texturing via automatic texture coordinate generation, projection-based texturing, and more. Common to all different ways of using textures is that high quality texture filtering may be needed to reduce aliasing problems. Aliasing may be extremely disturbing for the human viewer, especially for dynamic scenes.

A commonly used scheme for texture filtering that is implemented in hardware is mipmapping and, in the form of trilinear mipmapping, this provides relatively high quality filtering. A disadvantage is that overblurring can occur. However, it should be noted that this may be preferred over aliasing. Mipmapping is discussed for example by Lance Williams in "Pyramidal Parametrics," (*Computer Graphic, SIGGRAPH '83 Proceedings*, pp. 1-11, July 1983), the disclosure of which is hereby incorporated herein in its entirety by reference.

Trilinear mipmapping requires eight texels that are filtered into one color that is used, and thus, in the worst case, eight memory reads can be needed before the filtered color is obtained. Texture caches with prefetching can hide this problem, but such techniques may be expensive in hardware.

Anisotropic filtering schemes may reduce or eliminate overblurring by, e.g., filtering several trilinear mipmap samples. The ultimate goal is that those together may perfectly cover the quadrilateral that is obtained from projecting a pixel to texture space. While increasing quality, a number of memory reads may increase dramatically. Common numbers range from 16-128 texel reads.

Aspects of rendering, texture filtering, texture mapping, and/or parametrics are discussed in the following references: Akenine-Möller, Tomas, and Eric Haines, *Real-Time Rendering*, 2nd edition, June 2002; Beers, Andrew C., Maneesh Agrawala, and Navin Chaddha, "Rendering from Compressed Textures," *Computer Graphics (SIGGRAPH 96 Proceedings)*, pp. 373-378, August 1996; Behrens, Uwe, "Averaged Area Tables for Texture Filtering," *SIGGRAPH 2001 Conference Abstracts and Applications*, p. 150, 2001; Crow, Franklin C., "Summed-Area Tables for Texture Mapping," *Computer Graphics (SIGGRAPH '84 Proceedings)*, pp. 207-212, July 1984; McCabe, Dan, and John Brothers, "DirectX 6 Texture Map Compression," *Game Developer Magazine*, vol. 5, no. 8, pp. 42-46, August 1998; and Williams, Lance, "Pyramidal Parametrics," *Computer Graphics (SIGGRAPH '83 Proceedings)*, pp. 1-11, July 1983. The disclosures of each of these references are hereby incorporated herein in their entirety by reference.

For mobile platforms, memory accesses can be extremely expensive. On a standard computer graphics architecture, more than two thirds of the memory accesses can be due to texturing. In the example of trilinear mipmapping for instance, texturing may require eight memory accesses, whereas the rest of the rasterizer may require another three (z-read, z-write and colorbuffer write). With eleven memory accesses per pixel, the memory bandwidth need be very high to obtain reasonable performance. A high clock speed may cost a lot of power and may not be suitable for mobile platforms. It may thus be desirable to reduce the number of memory accesses that are needed for texturing, while maintaining a texture quality that is similar to trilinear mipmapping.

Texture compression is a means often used to save bandwidth in graphics hardware. The idea is that the texel values (which may comprise of, for example, RGB color values, gray scale values or other graphics representations) are stored in a compressed format in the memory, and this can reduce the bandwidth needed when the texture is sent over the bus. When the data reaches the destination, a hardware mechanism can decompress the texel data.

Pioneering work is discussed by Andrew C. Beers et al. in "Rendering from Compressed Textures," (*Computer Graphics, SIGGRAPH 96 Proceedings*, pp. 373-378, August 1996), the disclosure of which is hereby incorporated herein in its entirety by reference. Beers et al. discuss using vector quantization, and training the vector set using a number of images.

S3 Graphics Co., Ltd., has invented a texture compression scheme, which is often called S3TC (S3 Texture Compression). S3TC is discussed for example by McGabe et al. in "DirectX 6 Texture Map Compression" (Game Developer Magazine, vol. 5, no. 8, pp. 42-46, August 1998), the disclosure of which is hereby incorporated herein in its entirety by reference. The S3TC has been incorporated into DirectX, where it is called DXTC. The S3TC scheme compresses textures, that is, images that are "glued" onto geometric primitives (e.g., triangles) during rendering. The texture image is divided into 4×4 texel blocks, and each such block is compressed individually into 8 bytes. This may be done as follows. First, two texel reference values are stored in 16 bits each. Each texel reference value may for example be color encoded as red (5 bits), green (6 bits), and blue (5 bits). During decompression, an additional two texel reference values are computed in between the two stored texel reference values. This means that each 4×4 block has access to a total of four texel reference values (e.g., colors). Therefore, each of the 16 (4×4) texels can be encoded as an index into this "palette" of 4 texel reference values. Each index can be coded with 2 bits, and we call these indices texel index values. Each block requires 16+16+4*4*2=64 bits=8 bytes. Without compression, each block requires 3 bytes per texel, which gives 3*16=48 bytes. The compression ratio is thus 1:6.

S3TC decompression may proceed as follows, assuming rendering to a 24-bit display. Colors stored with 16 bits may be converted to 24 bits by zero-padding, although other ways to do this exist.

Assuming that the decompression algorithm receives a 64-bit sequence (00000 000000 00000 10000 100000 00000 00 00 00 00 01 01 01 01 10 10 10 10 11 11 11 11) as an input, the first two 16-bit values are the two texel reference values (colors), which, after zero padding, equals RGB1=(0, 0, 0) and RGB2=(128, 128, 0). Two more reference values may be found by taking:

$$RGB3 = \tfrac{2}{3} * RGB1 + \tfrac{1}{3} * RGB2 = (45\ 45\ 0) \text{ and}$$

$$RGB4 = \tfrac{1}{3} * RGB1 + \tfrac{2}{3} * RGB2 = (82\ 82\ 0).$$

Next come the texel index values, one for each texel, each coded with two bits, in row order. In this case, all the texels in the first row have the value 00, which means that RGB1=(0, 0, 0) will be picked. The next row is all RGB2 etc. Finally, the decoded block will have the texel values shown in Table 0:

TABLE 0

| (0, 0, 0) | (0, 0, 0) | (0, 0, 0) | (0, 0, 0) |
|---|---|---|---|
| (128, 128, 0) | (128, 128, 0) | (128, 128, 0) | (128, 128, 0) |
| (45, 45, 0) | (45, 45, 0) | (45, 45, 0) | (45, 45, 0) |
| (82, 82, 0) | (82, 82, 0) | (82, 82, 0) | (82, 82, 0) |

SUMMARY

According to some embodiments of the present invention, a block of texel values is stored by storing a first texel reference value, a second texel reference value, and one or more texel mapping values where each texel mapping value represents a 3-tuple of ternary index values. Each texel mapping value represents a k-tuple of references to the first texel reference value, the second texel reference value and/or a third texel reference value. A pixel value for the pixel is generated from the stored texel mapping values and the stored texel reference values, and the pixel is displayed responsive to the generated pixel value. The third texel reference value may be mathematically determined by the first and second texel reference values, e.g., the third texel reference value may represent an arithmetic mean of the first and second texel reference values. Texel reference values may comprise, for example, RGB color values, gray scale values, or other graphics representations.

In further embodiments of the present invention, respective pluralities of texel reference values and texel mapping values that map thereto are stored for respective ones of a plurality of overlapping blocks of texel values. In some embodiments, pixel values for pixels in a pixel map may be generated from stored texel values for sets of nearest neighbor texels in the plurality of overlapping blocks of texels, wherein the texel blocks overlap such that generating a color value for any pixel in the pixel map requires stored texel values for no more than a single block of texels. In further embodiments, pixel values may be generated for pixels in a pixel map from stored texel values for sets of nearest neighbor texels in the plurality of overlapping blocks of texels, wherein the texel blocks overlap such that generating a color value for any pixel in the pixel map requires stored texel values for no more than two blocks of texels.

According to still further embodiments of the invention, a first mipmap value for a pixel is bilinearly interpolated from retrieved texel values for a set of nearest neighbor texel values. A second mipmap value for the pixel is generated by averaging the retrieved texel values for the set of nearest neighbor texel values. A pixel value for the pixel is generated by interpolating between the first and second mipmap values.

Texture compression, block overlapping and texture filtering techniques according to the present invention can be used individually and/or in combination.

The present invention may be embodied as methods, apparatus and computer program products. For example, the present invention may be advantageously used in a handheld device, such as a wireless terminal, personal digital assistant (PDA), or the like.

DETAILED DESCRIPTION

Figure 1:
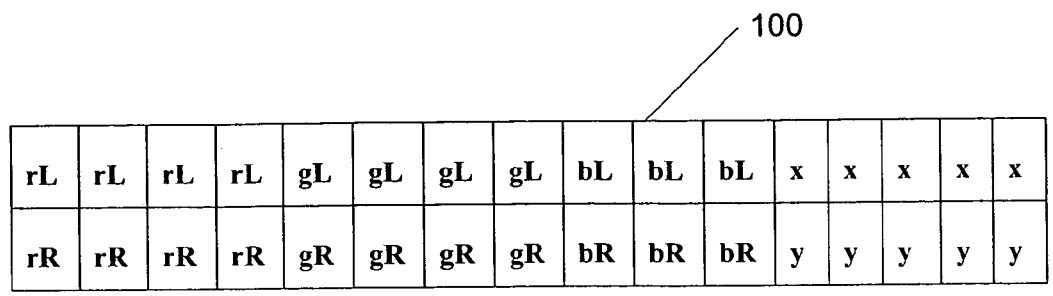
FIG. 1 illustrates a storage representation for a texel block according to some embodiments of the present invention.
Figure 2:
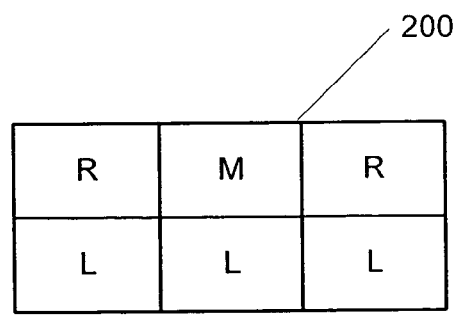
FIG. 2 illustrates two exemplary 3-tuples of ternary texel value mapping values according to further embodiments of the present invention.

The present invention will now be described more fully with reference to the accompanying drawings, in which exemplary embodiments of the present invention are shown. These embodiments are provided so that this application will be thorough and complete. Like numbers refer to like elements throughout.

According to various embodiments of the present invention described herein, novel approaches to texture filtering are presented that can significantly reduce bandwidth usage. Aspects of the invention can include:

Texture Compression; and/or

Texture Block Overlapping; and/or

Texture Filtering.

These three aspects can be combined according to embodiments of the present invention to provide a Poor Man's Texture Filtering System (POOMA). A brief summary of exemplary embodiments of such a system will first be given, and greater detail of how aspects of the present invention can be built will follow.

In some embodiments of the present invention, a texture image can be divided into small blocks (e.g. 3×2 texels), and texture compression can be used to reduce the memory bandwidth needed to fetch such a block, typically down to one 32-bit memory read. The next step, texture overlapping, can amount to making the blocks overlapping, so that every 2×2-neighbor group of texel values is always completely contained in one of the blocks. This makes it possible to do bilinear filtering with one memory access. Texture filtering as described herein provides a way of filtering four texel values to obtain the color of the pixel. Just as in the case of mipmapping, bilinear filtering on the four pixels can be used on the bottom mipmap level. However, instead of fetching texel values from the upper mipmap level, the average of the four recently read texel values is computed and that value is used instead. The result can provide a significantly better texturing than using nearest neighbor mipmapping, and can produce almost as good results as trilinear mipmapping. The cost may only be one 32-bit memory read per filtered color, compared to two for nearest neighbor mipmapping (poor quality) and eight for trilinear mipmapping (high quality).

A. Texture Compression

Aspects of texture compression decoders according to embodiments of the present invention described herein can read an entire block in just one 32-bit memory transfer. In the example of a 32-bit architecture, the following features taken alone or in combination, allow the ratio 1 block/memory transfer:

The block size is significantly smaller, e.g. 2×3 texels;

Three colors (two reference colors plus one in between) are used instead of four;

The reference colors are coded with 11 bits per color instead of 16; and/or

The three colors are coded with a ternary representation (as opposed to a binary representation).

These modifications make it possible to read an entire block in one 32-bit memory transfer (four bytes).

Before describing more in detail how a block can be stored, ternary representation will be explained. When going from 64 to 32 bits, it becomes undesirable to store two bits per index value for each texel. Having two bits means that each index value can assume one of four values. Instead, we allow only three different values. Either the index value refers to the first texture reference value, the second texture reference value, or a third texture reference value that can be a function of the first two reference values, e.g., the arithmetic average of the first two values. Each index variable is then ternary, since it can assume one of three possible values. Storing a single ternary value in a binary representation can be wasteful—two bits are needed, which is no better than the S3TC method.

To overcome this problem, a texture mapping value may be introduced. Each texture mapping value represents a small group ("tuple") of index values. By lumping together ternary index values, they can be stored more efficiently in a binary representation. For instance, a 3-tuple (group of three) of ternary index variables can be stored in five bits, since the number of possible combinations, $3^3=27$, is smaller than 32. In this way, a 3-tuple of ternary symbols can be represented using five bits. Those skilled in the art will understand that it is also possible to use 4-tuples, 5-tuples, and 6-tuples. In general, it is possible to represent a k-tuple of ternary symbols using ceiling $(\log(3^k)/\log(2))$ bits. In our example we have used 3-tuples, since this creates a look-up table of desirable size.

A 2×3 block of texel values can be represented using a data element 100 as shown in FIG. 1. In FIG. 1, the bits marked with rL, gL and bL represent the red, green and blue components of a first reference color, here marked with "L" as in "left". In the same way, the bits marked with rR, gR and bR represent a second reference color, marked with "R" as in "right". From these two colors, a "middle" reference color is created, by taking the arithmetic mean of R and L. This new reference color is denoted "M" as in "middle".

Moreover, the bits marked with x in FIG. 1 represent the first texel mapping value, which represents the texel index values of three of the texels in the block. For instance, we can choose that the top most three texels get their color from x, and that the lower-most texels are controlled by y. Both x and y are mapped to three-tuples of L, M and R by using Table 1. The range from 27 through 31 is not used.

TABLE 1

| 0: LLL | 4: LMM | 8: LRR | 12: MML | 16: MRM | 20: RLR | 24: RRL | 28: — |
|---|---|---|---|---|---|---|---|
| 1: LLM | 5: LMR | 9: MLL | 13: MMM | 17: MRR | 21: RML | 25: RRM | 29: — |
| 2: LLR | 6: LRL | 10: MLM | 14: MMR | 18: RLL | 22: RMM | 26: RRR | 30: — |
| 3: LML | 7: LRM | 11: MLR | 15: MRL | 19: RLM | 23: RMR | 27: — | 31: — |

An exemplary decoding process for a texel block will now be explained. Again, we will assume that conversion from 11 to 24 bits of color will be performed with zero padding for simplicity, but those skilled in the art will understand that other, better schemes for color conversion exist.

Assume that the decompression algorithm gets the 32-bit sequence (0000 0000 000 10111 1000 1000 000 00000) as an input. According to the bit layout in FIG. 1, the first texel reference value equals (0000 0000 000). Converted to 24 bits using zero padding, R=(the "right" color)=(0, 0, 0). Likewise, the second texel reference value is (1000 1000 000), which, after conversion to 24 bits, yields L=(the "left" color)=(128, 128 0). From these two texel reference values, a third reference value is created by using M=(the "middle" color)=(R+L)/2=(64, 64, 0).

Examining FIG. 1 again, there are two texel mapping values; x=23 (10111) and y=0 (00000). Starting with x, Table 1 indicates that 23 corresponds to the 3-tuple (R, M, R). This means that the indices for the top three texels in the block are R, M, and R, respectively. Doing the same for y shows that the lower three texels in the block have indices L, L, and L. Thus, the index values for the texels in the block may be decoded from the texel mapping values as shown in Table 2:

TABLE 2

| R | M | R |
|---|---|---|
| L | L | L |

Each index value relates to one of the texel references values. For instance, the first texel has an index value "R" and should be given the texel value (0, 0, 0). Thus, after decoding, the block will have the texel values show in Table 3:

TABLE 3

| (0, 0, 0) | (64, 64, 0) | (0, 0, 0) |
|---|---|---|
| (128, 128, 0) | (128, 128, 0) | (128, 128, 0) |

This allows 2×3=6 texel values to be read in just one 32-bit memory transfer. With 32 bits for the entire 2×3 block, compared to 16 bits per texel value, the compression ratio is 32:16×2×3, i.e., 1:3. Note that, if the texture is magnified, there is a rather big chance that the next pixel will address the same block. Thus, zero memory transfers may be needed for the texturing of that pixel.

B. Texture Block Overlapping

Figure 3:
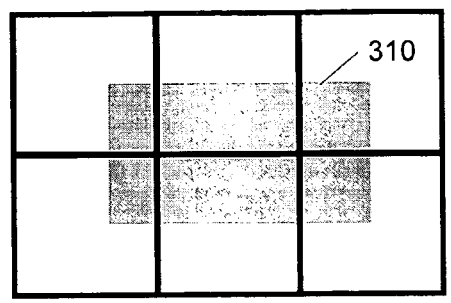
FIG. 3 illustrates an exemplary pixel/texel relationship.

When doing conventional bilinear interpolation, the four texel values closest to the pixel's sample point in the texture map may be needed. For example, as shown in FIG. 3, if the sample point of a pixel is within the gray area 310, all four of the nearest neighbor texel color values are found in the same block, and just one memory transfer is necessary. However, it may be necessary to fetch up to four blocks in order to get all the closest neighbors.

Figure 4:
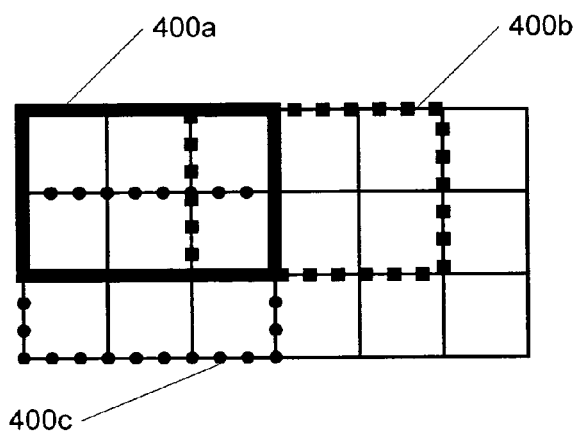
FIG. 4 illustrates an overlapping texel block arrangement according to some embodiments of the present invention.

In FIG. 4, it is shown how blocks can be laid out in an overlapping fashion according to embodiments of the invention to avoid additional reads for bilinear interpolation. The block 400a marked with a solid line thus overlaps both the block 400b marked with square dashes (to the right), and the block 400c marked with round dashes (underneath). For instance, the first 32-bit word in the memory can represent the block 400a, and the following 32-bit word in the memory can represent block 400b. In this fashion, it is always possible to find one 32-bit word that represents a block that contains all the four neighbors of a certain pixel's sample point. The four neighbors can thus be accessed in just one memory fetch.

This may come at the cost of expanding the data 1.5 times in the x-direction and 2 times in the y-direction. However, since the compression ratio of the texture compression is 1:3, we will end up with the same memory requirements as if neither texture compression nor texture overlapping were used.

Overlapping may be limited to one direction. For instance, by overlapping only in the x-direction, data is only expanded by a factor of 1.5. (Including the compression, the total storage is only 0.5 of the original.) Then, in 50% of the cases, all four texels are inside the block. In the remaining cases, another block must be read. Table 4 shows what memory requirements and what average bandwidth may be needed.

TABLE 4

| Overlap | Data expansion | Data compression | Memory storage requirements | Memory bandwidth (32 bit words) |
|---|---|---|---|---|
| x, y | 1.5 × 2 = 3 | 1/3 | 1 = 100% | 1 |
| y | 2 | 1/3 | 2/3 = 66% | 1.33 |
| x | 1.5 | 1/3 | 1/2 = 50% | 1.5 |
| no overlap | 1 | 1/3 | 1/3 = 33% | 2 |

We will now give an example of how the texture overlapping can work in practice. Assuming that the sample point of a pixel is situated as indicated by the cross in FIG. 5, the block 520 indicated with a solid outline contains the four nearest neighbor texels 103, 104, 110, 111.

Figure 5:
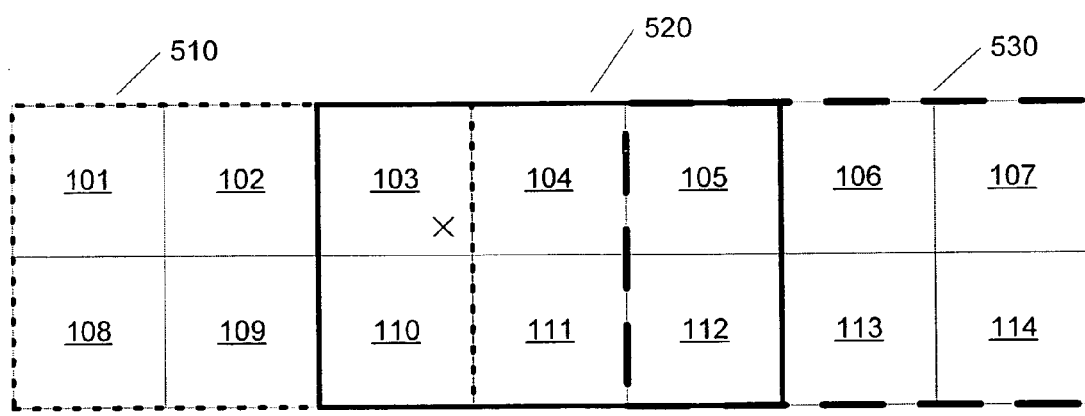
FIG. 5 illustrates a sample point for a pixel in a texture map according to exemplary embodiments of the present invention.

It is desirable to fetch the nearest neighbor texels 103, 104, 110 and 111. The texel blocks may be stored in an overlapping fashion. For instance, the representation for the texels in FIG. 5 can be laid out in the memory such as:

0xffa7b043 0x00178800 0xfa8787fa, where, referring to FIG. 5, 0xffa7b043 represents the block 510 marked with a dotted outline, 0x00178800 corresponds to the block 520 marked with a solid outline, and 0xfa8787fa corresponds to the block 530 marked with a dashed outline. In order to obtain all the nearest neighbor texels, the block marked 520 with a solid outline should be read. Thus, the value compression 0x00178800 should be from the memory. This may then be decoded according to the exemplary techniques described above.

C. Texture Filtering

Figure 6:
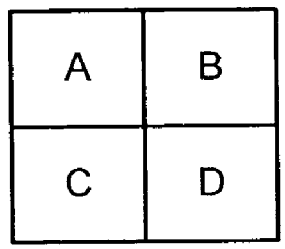
FIG. 6 illustrates an exemplary set of nearest neighbor texel values according to some embodiments of the present invention.

Once the four texel value neighbors of the pixel's sample point have been acquired, texturing can begin. Denoting the four nearest neighbor texel values with A, B, C and D as shown in FIG. 6, by using bilinear interpolation over A, B, C and D, a first, a lower level mipmap value Q can be obtained. By averaging A, B, C and D, a second, upper level mipmap value P can be obtained. A linear interpolation may be performed between the first and second mipmap values Q and P to determine a value for the pixel, depending upon how close the pixel is to the lower- and upper-mipmap levels.

Note that, if A is on even positions in both x and y direction in the texel map on a certain mipmap level, P will be the corresponding texel in the mipmap hierarchy one level up. In this case, the result will be equal to that of using bilinear interpolation in the lower mipmap level and nearest neighbor interpolation in the higher mipmap level. However, if A is not on even positions in both x and y direction, a value may be obtained that is more correct than just using nearest neighbor in the higher mipmap level. Thus the quality may be improved over using bilinear interpolation in the lower level and nearest neighbor interpolation in the upper level.

Sometimes, the result of the aforedescribed POOMA texture filtering even looks better than trilinear filtering, since the overblurring may not be as severe. Note that this texturing filtering may halve the number of memory transfers independently of texture compression and texture block overlapping.

According to aspects of the present invention, an ability to gain bits in the representation of the texels may be provided by using 3 levels (L, M and R) instead of four levels. The ternary representation may use only ceil(log(3^k)/log(2)) bits for k texels, instead of 2*k bits that may be required when four levels are used. This increases compression efficiency per block. According to other aspects, use of overlapping blocks may make it possible to lower the average number of blocks that need to be accessed in order to render a pixel down to one 32-bit memory access per pixel. According to yet additional aspects, filtering of the four neighboring texel values can be used to produce the pixel color. This means that only one mip-map level may need to be accessed per pixel, instead of two as in the case of trilinear mipmapping, thereby halving the number of memory accesses required. It will be appreciated that these features can be used in various combinations and/or separately.

An example of how a pixel value is calculated will now be explained. Assume that the sample point of the pixel is situated at the cross in block 520 as shown in FIG. 5. Assume further that we have already decoded the texel values for the block, and that they are as shown in Table 5:

TABLE 5

| (0, 0, 0) | (64, 64, 0) | (0, 0, 0) |
|---|---|---|
| (128, 128, 0) | (128, 128, 0) | (128, 128, 0) |

A first mipmap value can be calculated by bilinearly interpolating among the left most four texel values in the block.

Figure 7:
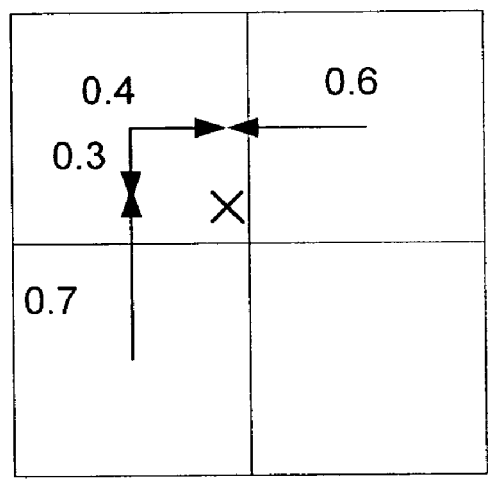
FIG. 7 illustrates a pixel location for texture filtering purposes according to some embodiments of the present invention.

This can be done the following way. Assume that the pixel is situated according to the "x" in FIG. 7. Then the bilinear coordinates are 0.3 and 0.4, respectively:

$$mipmap1 = (1 - 0.4) \times ((1 - 0.3) \times (0, 0, 0) + 0.3 \times (128, 128, 0)) + \\ 0.4 \times ((1 - 0.3) \times (64, 64, 0) + 0.3 \times (128, 128, 0)) \\ = (56, 56, 0)$$

After this, a second mipmap value can be calculated by averaging the four left most texel values in the block:

$$mipmap2 = ((0, 0, 0) + (64, 64, 0) + (128, 128, 0) + \\ (128, 128, 0))/4 \\ = (80, 80, 0)$$

The two mipmap values can be linearly interpolated to get a pixel value. The coefficients in this linear interpolation depend on proximity to the different mipmap levels. Assuming that the lower level is 0.2 away and the higher level is 0.8 away, then:

$$pixel = (1 - 0.2) \times mipmap1 + (1 - 0.8) \times mipmap2 \\ = 0.8 \times (56, 56, 0) + 0.2 \times (80, 80, 0) \\ = (61, 61, 0).$$

Thus, (61, 61, 0) is the pixel value that is drawn to the screen.

D. Exemplary Implementations

Figure 8:
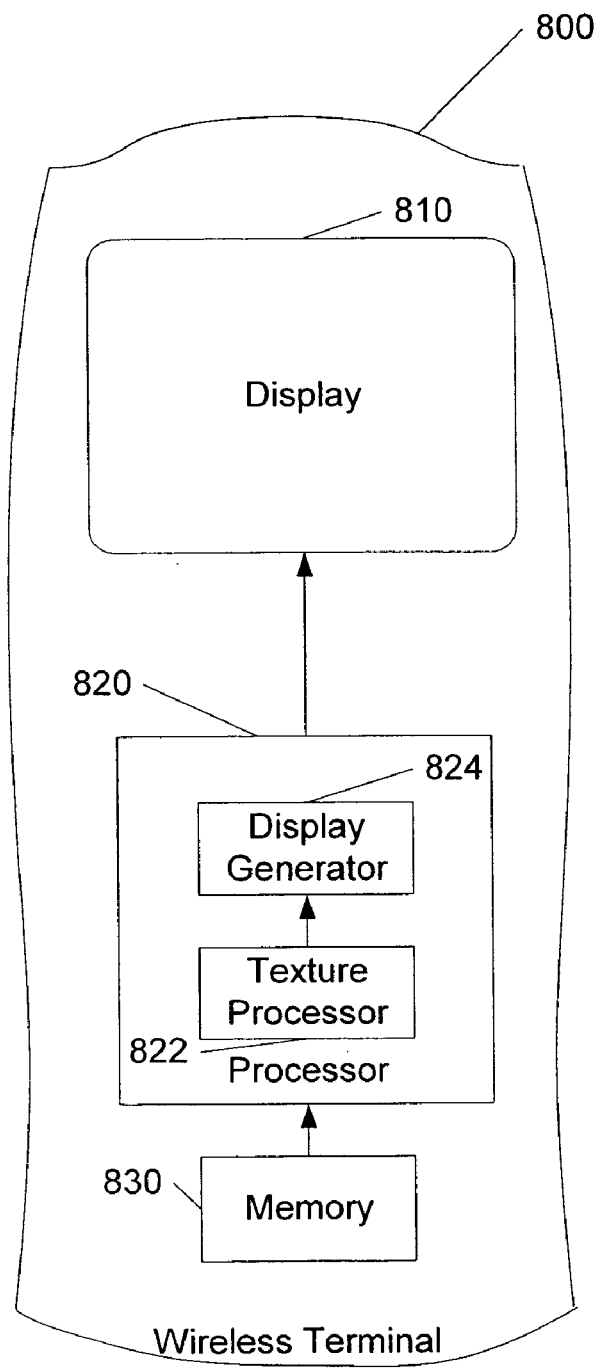
FIG. 8 illustrates a wireless terminal configured to provide texture processing according to some embodiments of the present invention.
Figure 9:
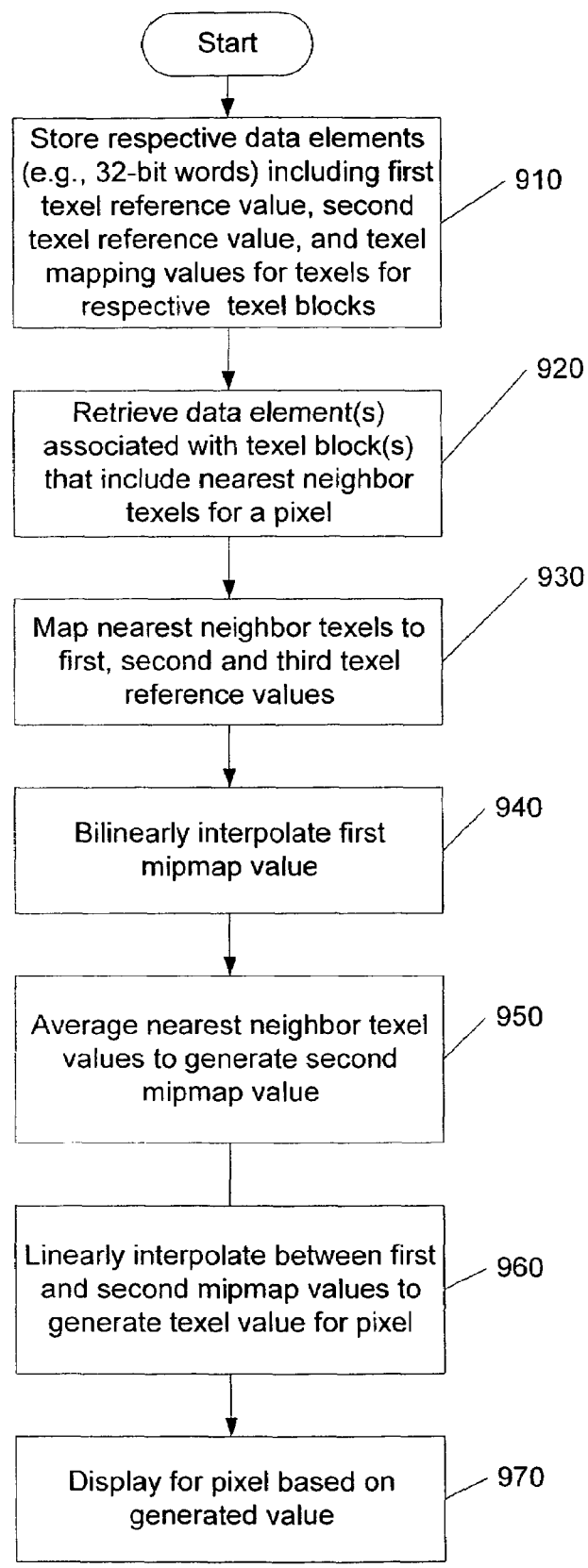
FIG. 9 is a flowchart illustrating exemplary texture processing operations according to further embodiments of the present invention.

In the present application, FIGS. 8 and 9 are diagrams illustrating exemplary apparatus and operations according to embodiments of the present invention. It will be understood that operations depicted in the diagrams, and combinations thereof, may be implemented using one or more electronic circuits, such as a circuits included in a component of a wireless communications system or in a wireless terminal. It will also be appreciated that, in general, operations depicted in the diagrams, and combinations thereof, may be implemented in one or more electronic circuits, such as in one or more discrete electronic components, one or more integrated circuits (ICs), one or more application specific integrated circuits (ASICs), and application specific circuit modules, as well as by computer program instructions which may be executed by a computer or other data processing apparatus, such as a microprocessor or digital signal processor (DSP), to produce a machine such that the instructions which execute on the computer or other programmable data processing apparatus create electronic circuits or other means that implement the specified operations. The computer program instructions may also be executed on one or more computers or other data processing apparatus to cause a series of actions to be performed by the computer(s) or other programmable apparatus to produce a computer implemented process that includes the specified operations.

The computer program instructions may also be embodied in the form of a computer program product in a computer-readable storage medium, i.e., as computer-readable program code embodied in the medium for use by or in connection with an instruction execution system. The computer-readable storage medium may include, but is not limited to, electronic, magnetic, optical or other storage media, such as a magnetic or optical disk or an integrated circuit memory device. For example, the computer program instructions may be embodied in memory included in a component of a wireless communications apparatus and/or storage medium operable to program such memory. Accordingly, blocks of the schematic diagrams of FIGS. 6 and 7 support electronic circuits and other apparatus that perform the specified operations, acts for performing the specified operations, and computer program products configured to perform the specified operations.

FIG. 8 illustrates a wireless terminal 800 in which the present invention may be embodied. The terminal 800 includes a display 810 that is controlled by a data processor 820, such as a microprocessor, microcontroller, digital signal processor (DSP), or graphics processor, and associated memory 830. A texture processor circuit 822, here shown as implemented in the processor 820, stores and retrieves texel block information in and from the memory 830. A display generator circuit 824, here also shown as implemented in the processor 820, controls the display 810 responsive to the texture processor circuit 822. The texture processor 822 circuit may be configured to perform texture compression and decompression, block overlapping and texture filtering techniques described herein.

It will be appreciated that the apparatus of FIG. 8 is provided for exemplary purposes, and that the invention may be embodied in any of a number of other forms. For example, the invention is equally amenable to application in other types of devices that generate graphics displays, including, but not limited to, desktop PCs and workstations, laptop, notebook, tablet and other portable computers, personal digital assistants (PDAs), and e-book readers and other portable graphic devices. It will be further appreciated that the graphics processing architecture illustrated in FIG. 6 is merely exemplary, and that a variety of architectures, such as architectures that use special-purpose dedicated graphics hardware to generate graphic displays, may be used with the invention. According to various embodiments of the present invention, the texture compression, texel block arrangement and texture filtering described herein may be used individually or in combination, and these operations may be applied in any of a number of different graphics processing environments, including that shown in the wireless terminal 800 of FIG. 8.

FIG. 9 illustrates exemplary texture processing operations according to some embodiments of the present invention, which may be implemented, for example, by the processor 820 and memory 830 of the wireless terminal of FIG. 8. Respective data elements (e.g., 32-bit words including RGB color information as described above) are stored for respective ones of a plurality of overlapping texel blocks (Block 910). Each of the data elements includes first and second texel reference values and one or more texel mapping values for the texels in the block, wherein the one or more texel values map 3-tuples of the texels to 3-tuples of ternary index values. Each index value refers to either the first texel reference value, the second texel reference value or a third texel reference value that is determined by the first and second reference values, e.g., as an arithmetic mean of the first and second texel reference values. It will be appreciated that the texel values may include, but are not limited to, RGB color values, gray scale values, and/or other representational forms commonly used in graphics applications.

Texturing of a pixel begins with retrieval of the data element or elements associated with the texel block or blocks including nearest neighbor texels, e.g., nearest four neighbors, for the pixel (Block 920). The texel mapping values in the retrieved data element(s) are then mapped to 3-tuples of the texel reference values (Block 930). A first mipmap value is bilinearly interpolated from the texel values for the nearest neighbor texels (Block 940) and a second mipmap value is generated by averaging the texel values for the nearest neighbor texels (Block 950). A pixel value for the pixel is linearly interpolated from the first and second mipmap values (Block 960), and the generated pixel value is used to display the pixel (Block 970).

Although FIG. 9 illustrates combined use of the novel texture compression, overlapping texel block arrangements, and texture filtering techniques of the present invention, it will be appreciated that use of subsets of these techniques in combination with conventional techniques falls within the scope of the present invention. For example, the novel texture compression techniques of the present invention can be used with a conventional, non-overlapping texel block arrangement and conventional bilinear, trilinear or other texture filtering techniques. Similarly, conventional texture storage and/or compression and conventional texture filtering techniques can be used with the novel texel block arrangements of the present invention. Finally, conventional texture storage and/or compression techniques and conventional texel block arrangements can be used with the novel texture filtering techniques of the present invention.

In the drawings and specification, there have been disclosed exemplary embodiments of the invention. Although specific terms are employed, they are used in a generic and descriptive sense only and not for purposes of limitation.

What is claimed is:

1. A method of texturing a pixel in a display apparatus having a memory, the memory coupled to a processor further having a texture processor circuit and display generator, the display generator being coupled to a display, comprising:

storing respective pluralities of texel reference values and texel mapping values that map thereto for respective ones of a plurality of overlapping blocks of texels; generating a pixel value for the pixel from the stored texel reference and mapping values, wherein the blocks of texels overlap in two orthogonal directions; and displaying the pixel responsive to the generated pixel value.

2. A method of texturing a pixel in a display apparatus having a memory, the memory coupled to a processor further having a texture processor circuit and display generator, the display generator being coupled to a display, comprising:

storing respective pluralities of texel reference values and texel mapping values that map thereto for respective ones of a plurality of overlapping blocks of texels; generating a pixel value for the pixel from the stored texel reference and mapping values, wherein the blocks of texels overlap in only one direction; and displaying the pixel responsive to the generated pixel value.

* * * * *